(12) United States Patent
Ikeuchi et al.

(10) Patent No.: US 9,661,192 B2
(45) Date of Patent: May 23, 2017

(54) VIDEO SIGNAL TRANSMISSION APPARATUS

(71) Applicant: Panasonic Intellectual Property Management Co., Ltd., Osaka (JP)

(72) Inventors: Nobuo Ikeuchi, Osaka (JP); Makoto Kimura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/167,835

(22) Filed: May 27, 2016

(65) Prior Publication Data

US 2016/0373616 A1 Dec. 22, 2016

(30) Foreign Application Priority Data

Jun. 18, 2015 (JP) ................................. 2015-122874
May 18, 2016 (JP) ................................. 2016-099363

(51) Int. Cl.
*H04N 5/04* (2006.01)
*H04N 5/067* (2006.01)
*H04N 5/38* (2006.01)
*G09G 5/00* (2006.01)
*H04L 7/00* (2006.01)
*H04N 21/2343* (2011.01)
*H04N 21/236* (2011.01)

(52) U.S. Cl.
CPC ............... *H04N 5/067* (2013.01); *G09G 5/00* (2013.01); *H04L 7/00* (2013.01); *H04N 5/38* (2013.01); *H04N 21/2343* (2013.01); *H04N 21/23602* (2013.01)

(58) Field of Classification Search
USPC ............... 348/723, 725, 500, 495, 540, 547
See application file for complete search history.

(56) References Cited

U.S. PATENT DOCUMENTS 4,872,054 A * 10/1989 Gray .................. H04N 7/01
348/441
7,038,669 B2 * 5/2006 Myers ................... G09G 5/006
345/204

(Continued)

FOREIGN PATENT DOCUMENTS

JP    2004-266745    9/2004

*Primary Examiner* — Paulos M Natnael
(74) *Attorney, Agent, or Firm* — McDermott Will & Emery LLP

(57) ABSTRACT

The video signal transmission apparatus according to the present disclosure transmits a pixel clock, signals, and image data which all are supplied from a video signal source. The signals include a vertical synchronizing signal, a horizontal synchronizing signal, a data enable signal, and a field signal. Each of the signals and the image data are in synchronization with the pixel clock. The video signal transmission apparatus includes a first format data processor and a transmitter. The first format data processor generates a plurality of data expressing a format of an image screen, based on the pixel clock and the signals, and for outputting the plurality of the data sequentially as serial data. The transmitter transmits, to a receiver by serial transmission, the image data, the vertical synchronizing signal, the pixel clock, and the serial data obtained from the first format data processor.

3 Claims, 8 Drawing Sheets

(56) References Cited

U.S. PATENT DOCUMENTS

| | | | | |
|---|---|---|---|---|
| 9,166,633 B2* | 10/2015 | Raveendran | ............ | H04B 1/034 |
| 2002/0067351 A1* | 6/2002 | Kim | ................... | G09G 3/2092 |
| | | | | 345/204 |
| 2006/0209892 A1* | 9/2006 | MacMullan | ............ | H04N 5/775 |
| | | | | 370/468 |
| 2009/0256922 A1* | 10/2009 | Gersten | ............... | H04N 5/4401 |
| | | | | 348/222.1 |
| 2012/0274849 A1* | 11/2012 | Suzuki | .................. | G09G 5/003 |
| | | | | 348/500 |

* cited by examiner

FIG. 5

| Addresses | Items |
|---|---|
| 0x01 | H-Pulse-Width (Pixel Order) |
| 0x02 | H-Total (Pixel Order) |
| 0x03 | H-Active (Pixel Order) |
| 0x04 | H-Back-Porch (Pixel Order) |
| 0x05 | V-Total (Line Order) |
| 0x06 | V-Active (Line Order) |
| 0x07 | V-Back-Porch (Line Order) |
| 0x08 | Field (0 or 1) |

VIDEO SIGNAL TRANSMISSION APPARATUS

BACKGROUND

Technical Field

The present disclosure relates to signal transmitters for transmitting and receiving video signals to and from devices.

Description of the Related Art

Patent Literature 1 discloses an interface apparatus suitable for transferring serial image signals. The apparatus allows a reduction in the number of signal lines needed for data transferring, the number of input-output pins, and the like.

CITATION LIST

Patent Literature

PTL 1: Japanese Patent Unexamined Publication No. 2004-266745

SUMMARY

The present disclosure is intended to provide a video signal transmission apparatus which can regenerate received-data on the receiver side, by adopting a simple configuration, in cases where the data are inputted via a data bus with a 2-bite width, and yet where a transmitter is used to convert the inputted data into a serial signal by using an 8b/10b encoder and to output the converted data.

The video signal transmission apparatus according to the present disclosure transmits a pixel clock, signals, and image data which all are supplied from a video signal source. The signals include a vertical synchronizing signal, a horizontal synchronizing signal, a data enable signal, and a field signal. Each of the signals and the image data are in synchronization with the pixel clock. The video signal transmission apparatus includes a first format data processor and a transmitter. The first format data processor generates a plurality of data expressing a format of an image screen, based on the pixel clock and the signals, and for outputting the plurality of the data sequentially as serial data. The transmitter transmits, to a receiver by serial transmission, the image data, the vertical synchronizing signal, the pixel clock, and the serial data obtained from the first format data processor. In cases where data are inputted via a data bus with a 2-bite width, and yet where a transmitter is used to convert the data into a serial signal with an 8b/10b encoder and to output it, video signal transmission apparatus according to the present disclosure is capable of regenerating the received data on the receiver side, with a simple configuration.

BRIEF DESCRIPTION OF DRAWINGS

FIG. 5 is a Table showing items of the timing information in the embodiment;

DETAILED DESCRIPTION OF THE PREFERRED EMBODIMENT

Hereinafter, detailed descriptions of an embodiment will be made with reference to the accompanying drawings as deemed appropriate. However, descriptions in more detail than necessary will sometimes be omitted. For example, detailed descriptions of well-known items and duplicate descriptions of substantially the same configuration will sometimes be omitted, for the sake of brevity and easy understanding by those skilled in the art.

Note that the accompanying drawings and the following descriptions are presented to facilitate fully understanding of the present disclosure by those skilled in the art and, therefore, are not intended to impose any limitations on the subject matter described in the appended claims.

Exemplary Embodiment

Hereinafter, descriptions will be made regarding a video signal transmission apparatus according to the present disclosure, with reference to FIGS. 1 to 8.

Configuration

Figure 1:
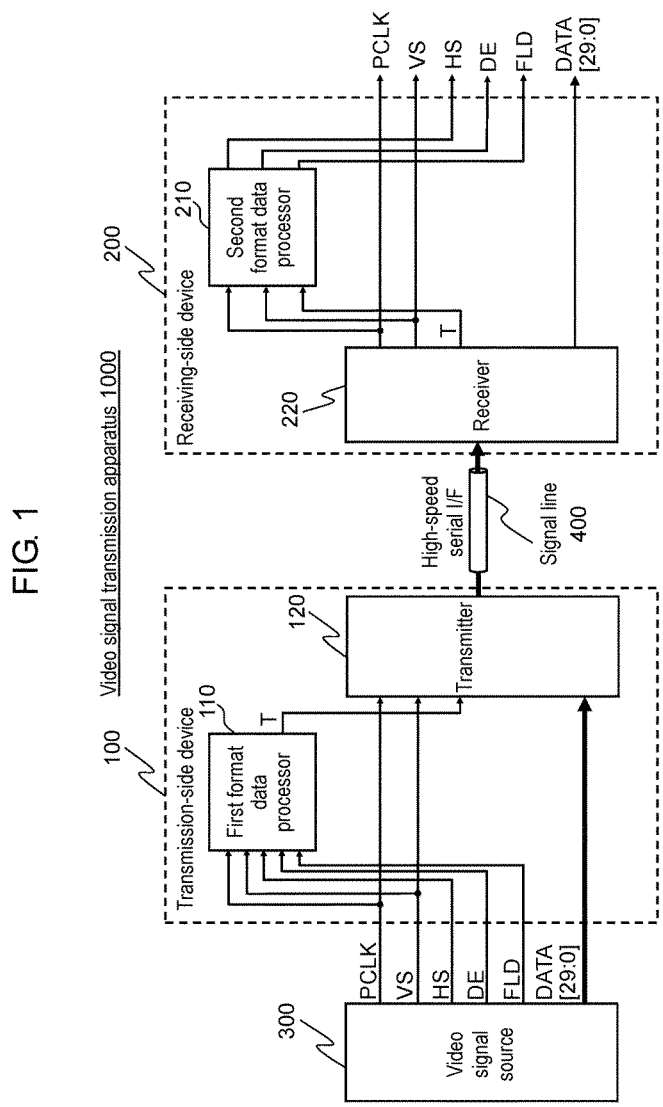
FIG. 1 is a block diagram of a video signal transmission apparatus according to an embodiment.

FIG. 1 is a block diagram of video signal transmission apparatus 1000 and video signal source 300 for supplying image signals to the apparatus. Video signal transmission apparatus 1000 includes transmission-side device 100 and receiving-side device 200. Transmission-side device 100 includes first format data processor 110 and transmitter 120. Receiving-side device 200 includes second format data processor 210 and receiver 220.

Video signal source 300 is a personal computer, a DVD player, or the like, for example. Transmitter 120 and receiver 220, which are coupled with each other by signal line 400 for high-speed serial transmission, perform transmission and reception of an image signal (video signal), respectively. Such an image signal is composed of image data (DATA signal) of 10 bits in each of R, G, and B, a VS signal, an HS signal, a DE signal, an FLD signal, and a PCLK signal. Here, the VS (Vertical Sync) signal is a vertical synchronizing signal; the HS (Horizontal Sync) signal is a horizontal synchronizing signal; and the DE (Data Enable) signal is a data enable signal which indicates an image effective region. Moreover, the FLD (Field Index) signal is a field signal which indicates whether a given field is an even or odd field when an interlaced format is adopted; and the PCLK signal is a pixel clock.

From video signal source 300, transmission-side device 100 is supplied with the image data together with the VS signal, HS signal, DE signal, FLD signal, and PCLK signal. In this configuration, the image data, VS signal, HS signal, DE signal, and FLD signal are supplied in synchronization with the PCLK signal. Of the signals transferred from video signal source 300 to transmission-side device 100, the signals including the VS signal, HS signal, DE signal, FLD signal, and PCLK signal, but excluding the image data, are supplied to first format data processor 110. Transmitter 120 is supplied with the image data, the VS signal, the PCLK signal, and timing information signal T having a 1-bit width. Here, the image data, VS signal, and PCLK signal are transferred from video signal source 300, while timing information signal T is output from first format data processor 110.

Transmitter 120 supplies these signals, by a method (8b/10b encoding) to be described later, to receiver 220 of receiving-side device 200, via signal line 400 serving as a high-speed serial interface (I/F). Receiver 220 extracts the VS signal, PCLK signal, and timing information signal T (1-bit width) from the received data, and then supplies the thus-extracted signals to second format data processor 210. Second format data processor 210 regenerates an HS signal, DE signal, and FLD signal from the supplied data, and then outputs the thus-regenerated signals.

Moreover, receiver 220 extracts 30-bit image data, and then outputs them together with the PCLK signal and the VS signal. As a result, receiving-side device 200 outputs, to a post-stage circuit (not shown), the image data, PCLK signal, VS signal, HS signal, DE signal, and FLD signal. Here, the image data, PCLK signal, and VS signal are output from receiver 220, while the HS signal, DE signal, and FLD signal are obtained by second format data processor 210.

Transmitter 120 and receiver 220, both shown in FIG. 1, transmit and receive high-speed serial signals, respectively. Transmitter 120, serving as a transmitting part, is configured with a serializer, an 8b/10b encoder, a transmitter circuit, and the like. Receiver 220, serving as a receiving part, is configured with a deserializer, an 8b/10b decoder, a receiver circuit, and the like.

Transmission-side device 100 and receiving-side device 200 are each configured mainly with a Field Programmable Gate Array (FPGA).

Figure 2:
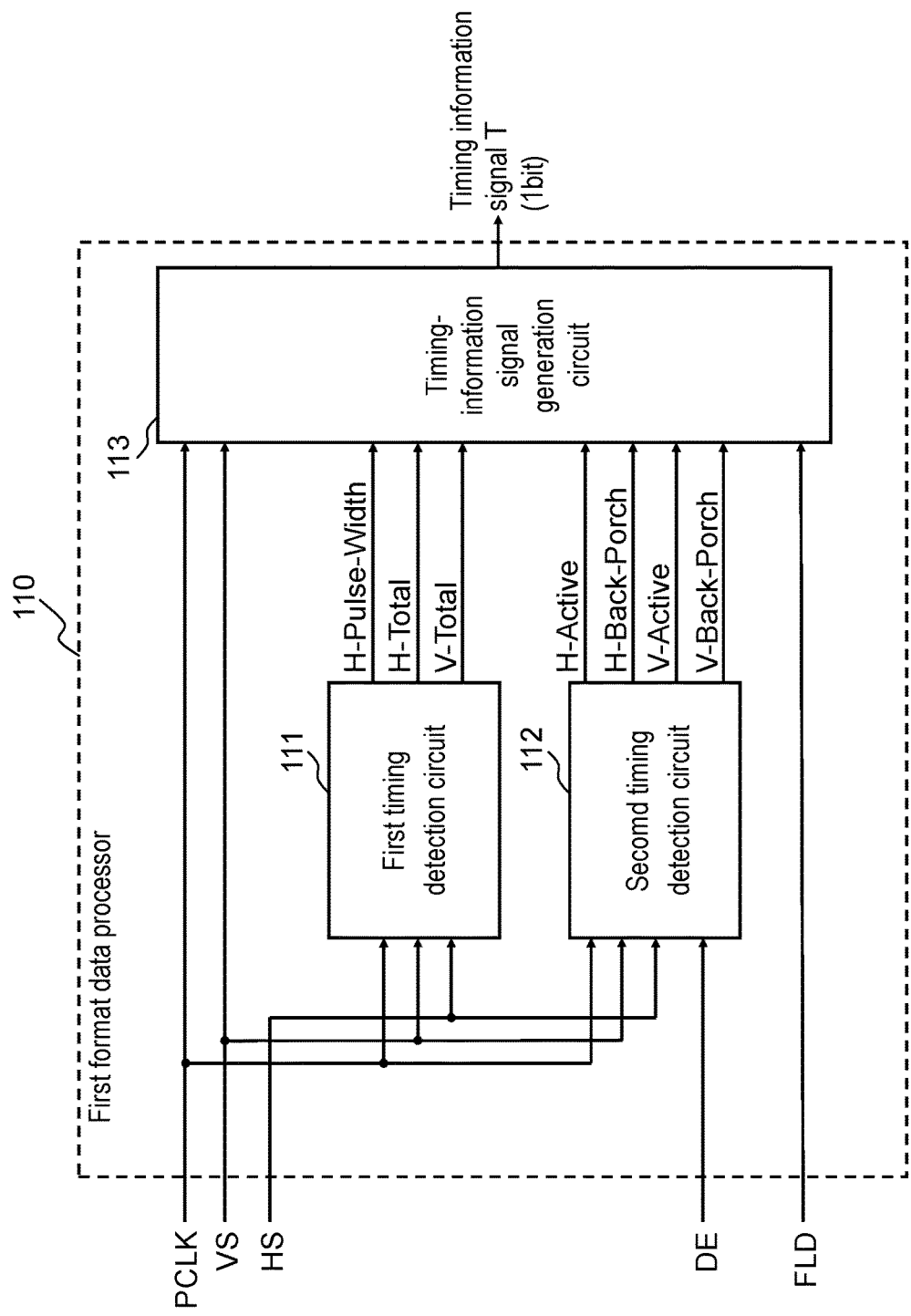
FIG. 2 is a detailed view of a first format data processor according to the embodiment.

FIG. 2 shows details of first format data processor 110. First format data processor 110 includes first timing detection circuit 111, second timing detection circuit 112, and timing-information signal generation circuit 113. First timing detection circuit 111 detects timing information of three items (H-Pulse-Width, H-Total, and V-Total) from the HS signal, VS signal, and PCLK signal, and then outputs the thus-detected information to timing-information signal generation circuit 113. Second timing detection circuit 112 detects timing information of four items (H-Active, H-Back-Porch, V-Active, and V-Back-Porch) from the HS signal, VS signal, and PCLK signal, and then outputs the thus-detected information to timing-information signal generation circuit 113. Details of the timing information will be described later. First timing detection circuit 111 and second timing detection circuit 112 may be integrally configured as a timing detection circuit.

Timing-information signal generation circuit 113 is inputted with the FLD signal, the PCLK signal, the VS signal, and the 7-item timing information which is output from first timing detection circuit 111 and second timing detection circuit 112. Timing-information signal generation circuit 113 reads the statuses of the 7-item timing information and the FLD signal, and then generates timing information signal T with a 1-bit width on the basis of the PCLK signal and the VS signal.

Figure 3:
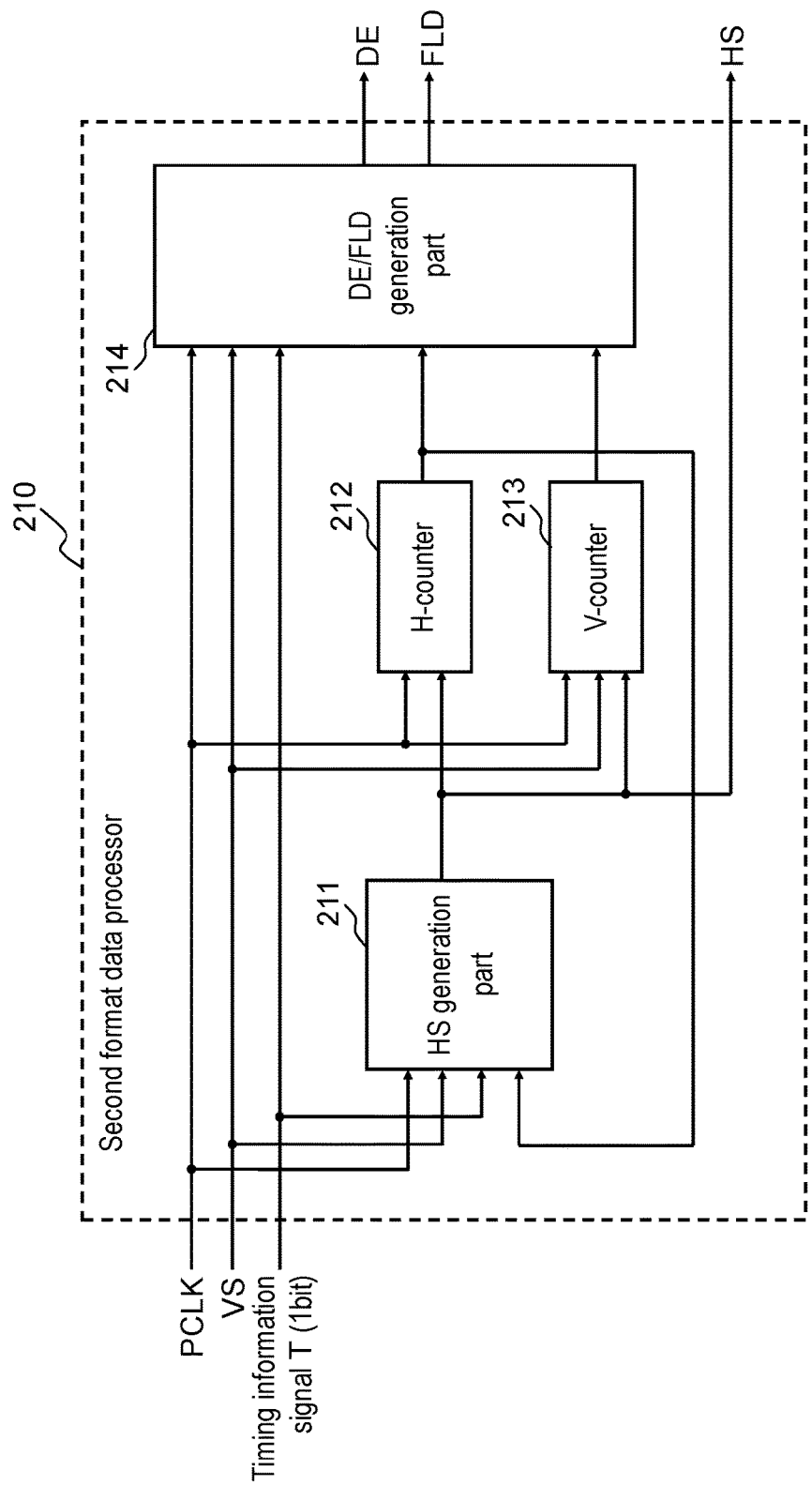
FIG. 3 is a detailed view of a second format data processor according to the embodiment.

FIG. 3 shows details of second format data processor 210. Second format data processor 210 includes HS generation part 211, H-counter 212, V-counter 213, and DE/FLD generation part 214. HS generation part 211 generates an HS signal from the PCLK signal, VS signal, and timing information signal T. H-counter 212 and V-counter 213 count up the cycles of the HS signal and VS signal, respectively. DE/FLD generation part 214 generates a DE signal and an FLD signal, from the VS signal, timing information signal T, PCLK signal, output of the H-counter, and output of the V-counter.

Operations

Descriptions will be made regarding operations of the video signal transmission apparatus according to the embodiment shown in FIGS. 1 to 3, with reference to FIGS. 4 to 8.

The video signal output from video signal source 300 is composed of the image data (DATA [29:0]) of 10 bits in each of R, G, and B, VS signal, HS signal, DE signal, and FLD signal. This video signal is inputted to transmission-side device 100 of video signal transmission apparatus 1000, as a parallel signal with a total 34-bit width in synchronization with the pixel clock PCLK signal. Here, all of the VS signal, HS signal, and DE signal are high active. Moreover, the FLD signal is used only when the input format is an interlaced format. For other formats, the signal is fixed at a low level.

In many cases, transmitter 120 for high-speed serial transmission is configured such that the bus width of its input port is commonly on the order of 2 bytes. Consequently, all of the total 34-bit data cannot be inputted. Thus, first format data processor 110 converts the HS signal, DE signal, and FLD signal into a serial signal with a 1-bit width, at a rising edge of the VS signal. The resulting serial signal serves as timing information signal T.

Figure 4:
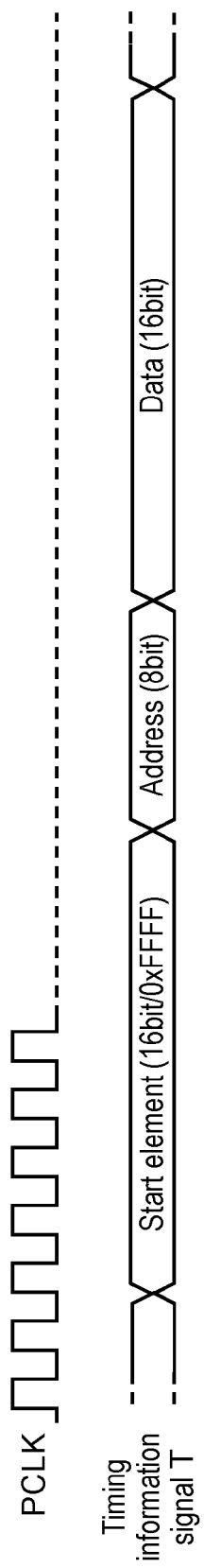
FIG. 4 is a chart illustrating a timing information signal in the embodiment.

A format of timing information signal T is shown in FIG. 4. In the embodiment, a 2-byte "start element (16 bits/ 0xFFFF)" is followed by a 1-byte "address (8 bits)" and 2-byte "data (16 bits)." Note that the start element is used in performing alignment of the serial data on the receiving side. Timing information signal T is fixed at a "Low" level except when the timing information is being transmitted.

Timing information signal T is composed of 8 items shown in FIG. 5. As shown in FIG. 5, the 8 items of the timing information are assigned corresponding to the addresses from "0x01" to "0x08." Here, the expression of "0x" indicates that it is a hexadecimal digit. The data of each item is updated every frame of the image signal.

Moreover, the following data shown in FIG. 2 are once stored in a memory. Such stored data include: the timing information of the three items (H-Pulse-Width, H-Total, and V-Total) which are fed from first timing detection circuit 111; the timing information of the four items (H-Active, H-Back-Porch, V-Active, and V-Back-Porch) which are fed from second timing detection circuit 112; and the timing information (Field) from the FLD signal. Then, these stored data are output, as serial data with a 1-bit width in timing information signal T shown in FIG. 4, from timing-information signal generation circuit 113. The start element, address, and data in timing information signal T are required to be continuously transmitted as shown in FIG. 4. However, the timing of transmission of each item is not specifically required. That is, regarding the timing, it is only required for all these items to be transmitted within the period of one frame of the image signal.

Figure 6:
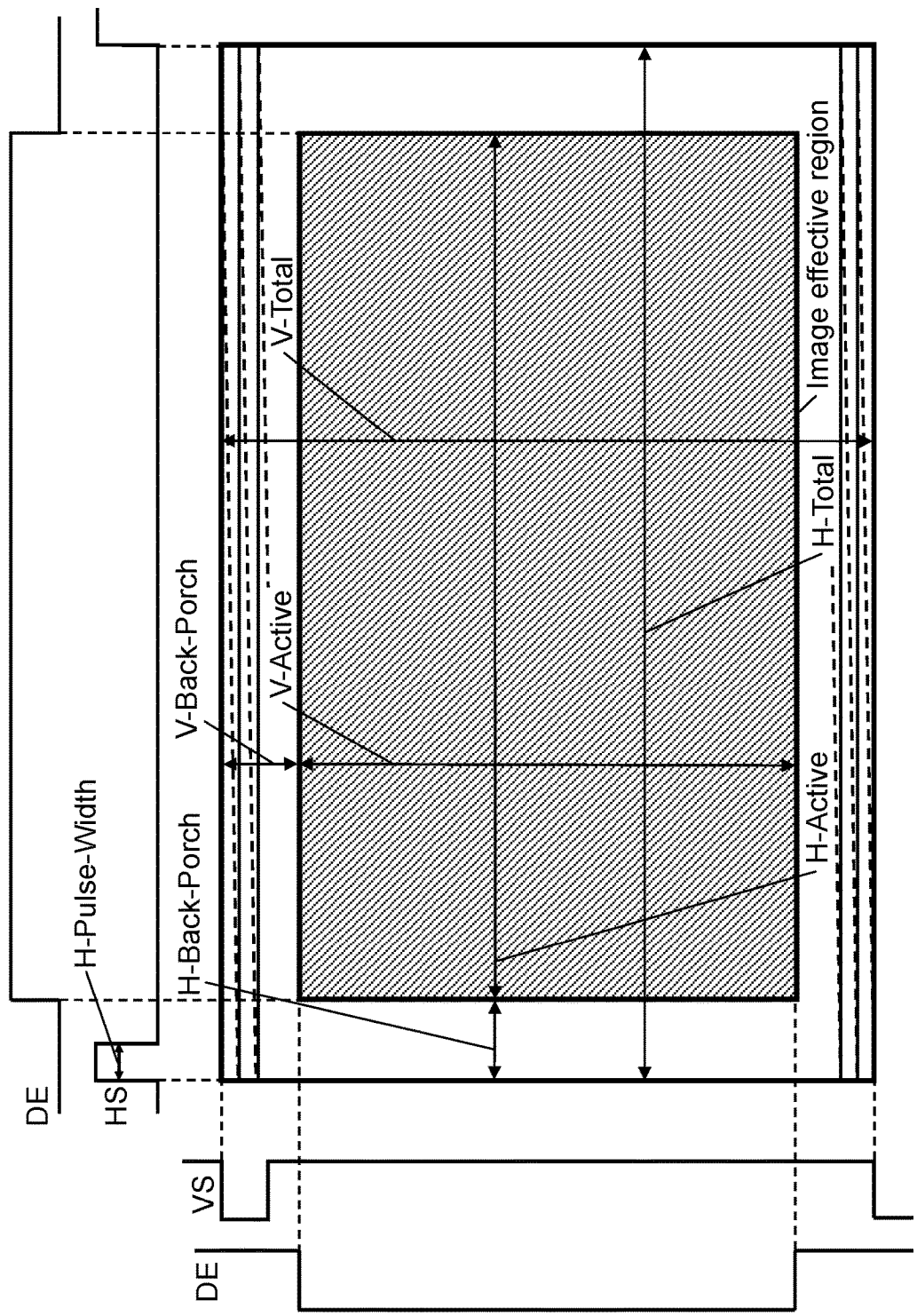
FIG. 6 is a chart illustrating the timing information in the embodiment.

Now descriptions will be made regarding the timing information of the eight items, with reference to FIG. 6.

H-Pulse-Width indicates the pulse width of the HS signal. The pulse width is calculated by counting up the number of rising edges of the PCLK signal, for the interval from the rising edge to the falling edge of a pulse of the HS signal.

H-Total indicates the pulse period of the HS signal. The pulse period is calculated by counting up the number of rising edges of the PCLK signal, for the interval from the rising edge of a pulse of the HS signal to the rising edge of the next pulse of the HS signal.

The H-Active indicates the horizontal width of an image effective region. The horizontal width is calculated by counting up the number of rising edges of the PCLK signal, for the interval from the rising edge to the falling edge of a pulse of the DE signal.

The H-Back-Porch indicates the interval from the HS signal to the starting position of the image effective region. This interval is calculated by counting up the number of rising edges of the PCLK signal, for the interval from the rising edge of a pulse of the HS signal to the rising edge of the pulse of the DE signal which follows the pulse of the HS signal.

The V-Total indicates the pulse period of the VS signal, on the order of lines. This pulse period is calculated by counting up the number of rising edges of the HS signals, for the interval from the rising edge of a pulse of the VS signal to the rising edge of the next pulse of the VS signal.

The V-Active indicates the vertical width of the image effective region, on the order of lines. This vertical width is calculated, every frame of the image signal, by counting up the number of rising edges of the HS signal, for the interval from the rising edge of the first pulse to the rising edge of the last pulse of the DE signal in the frame.

The V-Back-Porch indicates the interval from the VS signal to the starting position of the image effective region, on the order of lines. This interval is calculated by counting up the number of rising edges of the HS signal, for the interval from the rising edge of a pulse of the VS signal to the rising edge of the first pulse of the DE signal which follows the pulse of the VS signal.

"Field" is information that indicates whether a given field is an even or odd field when the input signal is in an interlaced format; the "Field" takes a value of either 0 (zero) or 1.

In this way, the timing information of eight items is data which can characterize the format of an image screen.

Use of the timing information of eight items described above allows receiving-side device 200 to regenerate an HS signal, DE signal, and FLD signal, by using counter circuits. Such regeneration is made with reference to the rising edges of the VS signal that is transmitted, as it is, for serving as a reference signal for data reproduction.

These items of the information are transmitted through the following processing: That is, an address (e.g., "0x01") shown in FIG. 5 is assigned to the "address (8 bits)" of the timing information shown in FIG. 4. Subsequently, data of the item corresponding to the thus-assigned address are assigned to the "data (16 bits)." Assuming that the thus-entered address is "0x01," for example, then the assigned data are the number of pixels which indicates the H-Pulse-Width (the pulse width of the HS signal). In this manner, subsequently, data corresponding to each of the remaining items other than the H-Pulse-Width are transmitted.

Upon receiving the PCLK signal, VS signal, and HS signal, first format data processor 110 shown in FIG. 2 operates such that first timing detection circuit 111 receives these signals to calculate data of each of the H-Pulse-Width, H-Total, and V-Total. On the other hand, the processor also operates such that second timing detection circuit 112 receives the PCLK signal, VS signal, HS signal, and DE signal to calculate data of each of the H-Active, H-Back-Porch, V-Active, and V-Back-Porch. Timing-information signal generation circuit 113 generates timing information signal T as serial data with a 1-bit width, on the basis of these thus-calculated data and the status of the FLD signal. The timing information signal is updated every frame.

Second format data processor 210 shown in FIG. 3 operates such that HS generation part 211 regenerates an HS signal on the basis of the received VS signal, timing information signal T, and PCLK signal, and then outputs the thus-regenerated HS signal. Here, the regeneration of the HS signal is made on the basis of data including: the count value of the PCLK signal with reference to the rising edge of the VS signal; and the H-Pulse-Width and H-Total in timing information signal T.

Figure 7:
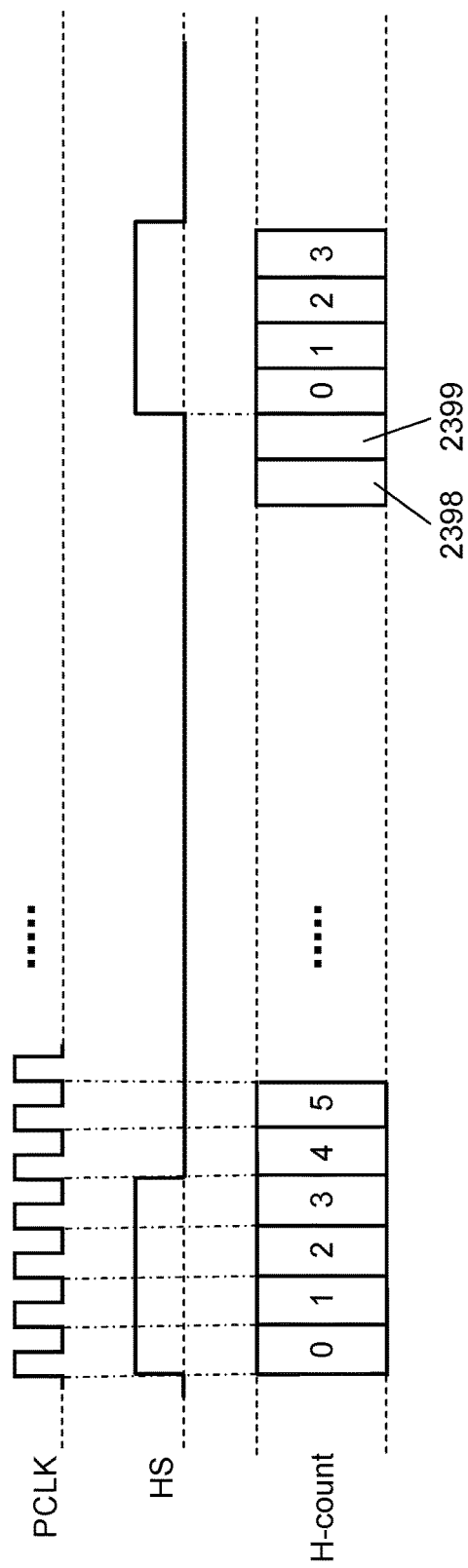
FIG. 7 is a signal waveform chart illustrating operations of a horizontal counter according to the embodiment.

Operations of H-counter 212 (horizontal counter) is shown in FIG. 7. H-counter 212 counts up rising edges of the PCLK signal, for the interval from the rising edge of a pulse of the HS signal to the rising edge of the next pulse of the HS signal. That is, the pulse period of the HS signal is counted on the order of pixels, and the count value (H-count) is output.

Figure 8:
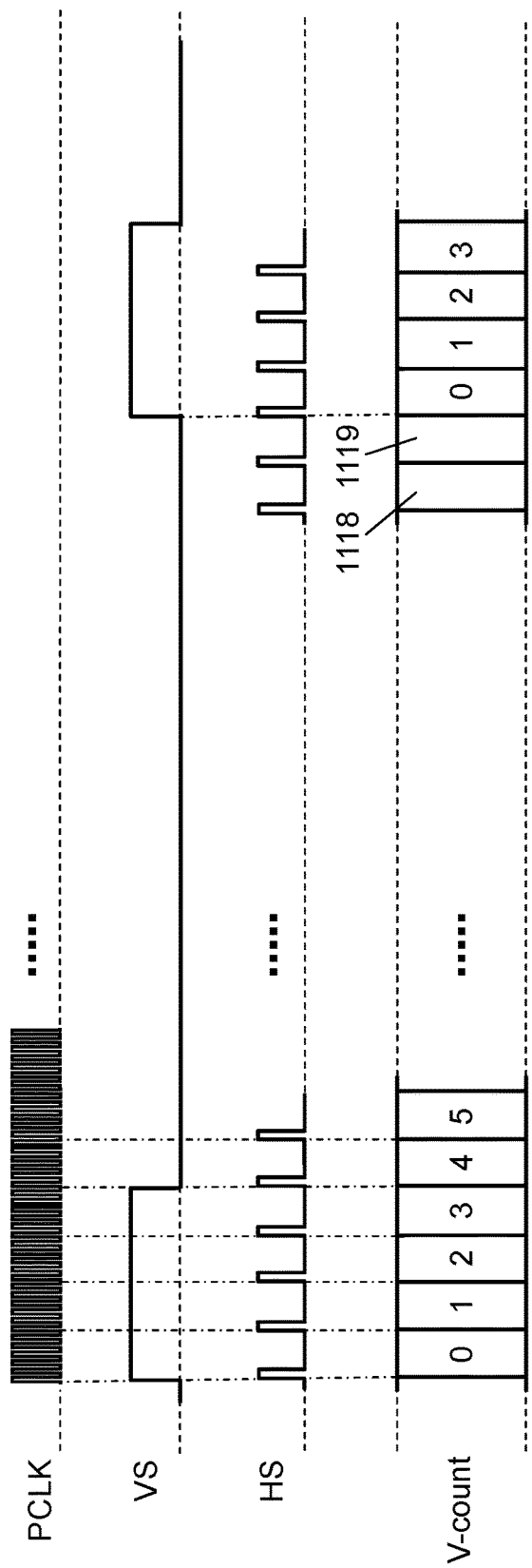
FIG. 8 is a signal waveform chart illustrating operations of a vertical counter according to the embodiment.

Operations of V-counter 213 (vertical counter) is shown in FIG. 8. V-counter 213 counts up the number of rising edges of the HS signal, for the interval from the rising edge of a pulse of the VS signal to the rising edge of the next pulse of the VS signal. That is, the pulse period of the VS signal is counted on the order of lines, and the count value (V-count) is output.

After that, as shown in FIG. 3, the outputs from both H-counter 212 and V-counter 213 are inputted to DE/FLD generation part 214. DE/FLD generation part 214 regenerates a DE signal and an FLD signal with reference to the rising edge of the VS signal, on the basis of timing information signal T. In addition, the output from H-counter 212 is also fed back to HS generation part 211 such that the output will be used as a reference for the timing of output of the next HS signal.

The DE signal output from DE/FLD generation part 214 is at a "High" level when the output values from both H-counter 212 and V-counter 213 indicate a point within the image effective region. Unless the values indicate such a point, the DE signal remains at a "Low" level.

The FLD signal is output, every frame, at either a "High" or a "Low" level from DE/FLD generation part 214, in accordance with the data of "Field" in timing information signal T.

In this way, as described above, video signal transmission apparatus 1000 can transmit and receive the data signal of total 34 bits, without data missing, that is composed of the image data of 10 bits in each of R, G, and B, and the synchronization signals, i.e. the VS signal, HS signal, DE signal, and FLD signal.

Advantageous Effects

Conventional technologies have had a problem in ease of porting the system because they require complicated arithmetic processing of format detection and a data table of phase information of both FLD signal and DE signal for every format. Fortunately, in the embodiment, receiving-side device 200 automatically generate the HS signal, FLD signal, and DE signal with reference to the VS signal, on the basis of the phase information in timing information signal T that is transmitted by the serial communication. This eliminates the need for the processing of format detection and the data table, resulting in downsizing of the system.

As described above, the embodiment has been described to exemplify the technology disclosed in the present application. However, the technology disclosed in the present application is not limited to the embodiment, and is also applicable to other embodiments that are subjected, as appropriate, to various changes and modifications, replacements, additions, omissions, and the like. Moreover, the technology disclosed herein also allows another embodiment which is configured by combining the appropriate constituent elements in the embodiment described above.

INDUSTRIAL APPLICABILITY

The technology according to the present disclosure is applicable to transmitters for high-speed serial transmission which each are configured including an FPGA, video signal transmission apparatuses each including a receiver, and image apparatuses which employ these apparatuses.

What is claimed is:

1. A video signal transmission apparatus for transmitting a pixel clock, image data, and signals including:
   a vertical synchronizing signal;
   a horizontal synchronizing signal;
   a data enable signal; and
   a field signal,
   the pixel clock, the image data, and the signals being supplied from a video signal source, the image data and the signals being in synchronization with the pixel clock,
   the video signal transmission apparatus comprising:
   a first format data processor for generating a plurality of data expressing a format of an image screen, based on the pixel clock and the signals, and for outputting the plurality of the data sequentially as serial data; and
   a transmitter for transmitting, to a receiver by serial transmission, the image data, the vertical synchronizing signal, the pixel clock, and the serial data obtained from the first format data processor,
   wherein the plurality of the data expressing the format of the image screen includes eight pieces of data indicating:
   a pulse width of the horizontal synchronizing signal;
   a pulse period of the horizontal synchronizing signal;
   a horizontal width of an image effective region;
   an interval from a rising edge of a pulse of the horizontal synchronizing signal to a starting position of the image effective region;
   a pulse period of the vertical synchronizing signal;
   a vertical width of the image effective region;
   an interval from a rising edge of a pulse of the vertical synchronizing signal to the starting position of the image effective region; and
   one of an even field and an odd field.

2. The video signal transmission apparatus according to claim 1, further comprising a second format data processor being supplied with signals received by the receiver, the supplied signals including the vertical synchronizing signal, the pixel clock, and the plurality of the data expressing the format of the image screen,
   wherein, based on the supplied signals, the second format data processor regenerates the horizontal synchronizing signal, the data enable signal, and the field signal.

3. The video signal transmission apparatus according to claim 1, wherein the serial data have a 1-bit width.

* * * * *